United States Patent
Chivetta et al.

(10) Patent No.: US 10,489,331 B2
(45) Date of Patent: Nov. 26, 2019

(54) REMOTE SERVICE DISCOVERY AND INTER-PROCESS COMMUNICATION

(71) Applicant: Apple Inc., Cupertino, CA (US)

(72) Inventors: Anthony J. Chivetta, San Francisco, CA (US); Joseph R. Auricchio, Redwood City, CA (US); Ion Valentin Pistol, Santa Clara, CA (US); Andrey V. Talnikov, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/352,502

(22) Filed: Mar. 13, 2019

(65) Prior Publication Data
US 2019/0286598 A1    Sep. 19, 2019

Related U.S. Application Data

(60) Provisional application No. 62/643,820, filed on Mar. 16, 2018.

(51) Int. Cl.
| | |
|---|---|
| *G06F 13/40* | (2006.01) |
| *G06F 13/42* | (2006.01) |
| *G06F 9/54* | (2006.01) |
| *H04L 29/06* | (2006.01) |
| *H04L 29/08* | (2006.01) |

(52) U.S. Cl.
CPC .......... *G06F 13/4027* (2013.01); *G06F 9/546* (2013.01); *G06F 13/4282* (2013.01); *G06F 2213/0042* (2013.01); *H04L 29/06047* (2013.01); *H04L 29/06537* (2013.01); *H04L 67/1091* (2013.01)

(58) Field of Classification Search
CPC .. G06F 13/4027; G06F 13/4282; G06F 9/546; H04L 29/06047; H04L 29/06537; H04L 67/1091
See application file for complete search history.

(56) References Cited

U.S. PATENT DOCUMENTS

| | | | |
|---|---|---|---|
| 8,112,766 B2 | 2/2012 | Regnier et al. | |
| 9,262,225 B2 | 2/2016 | Davis et al. | |
| 9,462,089 B1 * | 10/2016 | Fallows | .......... H04L 69/22 |

(Continued)

FOREIGN PATENT DOCUMENTS

WO    2017035486    3/2017

*Primary Examiner* — Glenn A. Auve
(74) *Attorney, Agent, or Firm* — Jaffery Watson Mendonsa & Hamilton LLP

(57) ABSTRACT

One embodiment provides for an electronic device comprising a first processor to execute a first operating system and a second processor to execute a second operating system. The second processor a set of input/output devices within the electronic device. The electronic device additionally includes an interconnect to enable communication between the first processor and the second processor. The operating systems include communication modules which establish a bi-directional network connection over the interconnect. Via the bi-directional network connection, the communication modules establish a multi-channel inter-process communication link between a first process on the first processor and a second process on the second processor to enable communication between the processes.

20 Claims, 13 Drawing Sheets

(56) References Cited

U.S. PATENT DOCUMENTS

| | | | |
|---|---|---|---|
| 2004/0257985 A1* | 12/2004 | Sahai | H04L 41/5025 |
| | | | 370/229 |
| 2010/0257294 A1 | 10/2010 | Regnier et al. | |
| 2012/0093155 A1* | 4/2012 | Poddar | H04L 69/22 |
| | | | 370/392 |
| 2017/0091090 A1* | 3/2017 | Wang | G06F 12/0808 |
| 2017/0185563 A1 | 6/2017 | Underwood et al. | |
| 2018/0285172 A1* | 10/2018 | Turner | G06F 9/542 |
| 2018/0285268 A1* | 10/2018 | Korgaonkar | G06F 12/0811 |

* cited by examiner

REMOTE SERVICE DISCOVERY AND INTER-PROCESS COMMUNICATION

CROSS-REFERENCE

This application claims priority to U.S. Provisional Patent Application No. 62/643,820 filed Mar. 16, 2018, which is hereby incorporated herein by reference.

FIELD

Embodiments described herein relate to computing systems, and more specifically, to computing system frameworks that enable remote service discovery and inter-process communication between computing environments.

BACKGROUND OF THE DISCLOSURE

An operating system is a collection of software that manages device hardware resources and provides common services for computer programs such as application software. Application software can be considered to be the computer program that causes a computer or other data processing system to perform useful tasks in response to user requests or other requests or other inputs. A specific instance of application software is called a software application, application program, application or app. Application programs usually require an operating system to function, as the operating system mediates the applications access to resources and devices of the device.

In the case of computer application programs, application developers may wish to utilize multiple processes for their particular application. In certain cases, for example, applications may be designed to take advantage of services provided by other applications or by an operating system running on a computing device. These services may be a set of computer-implemented instructions designed to implement a specific function or perform a designated task. An application may call (e.g., make use of) one or more of these services to avoid redundant software code for commonly performed operations.

SUMMARY OF THE DESCRIPTION

Described herein is an inter-process communication system for a computing device that facilitates communication between processes executing on an application processor and processes executing on a platform processor within the computing device. Additionally, a service discovery mechanism is enabled to allow services provided by a process on a remote processor to be discovered. A rich set of properties can be broadcast, with service discovery mediated via a trusted intermediary, without requiring mutual authentication between clients and servers of authorized services.

One embodiment described herein provides an electronic device comprising a first processor to execute a first operating system, the first processor including one or more application processor cores; a second processor to execute a second operating system, the second processor including one or more processor cores to manage a set of input/output devices within the electronic device; and an interconnect to enable communication between the first processor and the second processor, wherein the first operating system includes a first communication module, the second operating system includes a second communication module, and the first communication module and the second communication module are to establish a bi-directional network connection over the interconnect and, via the bi-directional network connection, establish a multi-channel inter-process communication link between a first process on the first processor and a second process on the second processor, the multi-channel inter-process communication link including at least a default channel and a reply channel.

One embodiment provides for a non-transitory machine-readable medium storing instruction which, when executed by one or more processors, cause the one or more processors to perform operations comprising receiving an indication of attachment of a device over a virtual bus connection between a platform node and an application node of a computing device; establishing a device connection over an internal network established between the platform node and the application node; exchanging a list of services offered on each node for the device; configuring client capabilities with respect to the service and the device; and establishing a remote communication channel between a service client and a service provider for the device.

One embodiment provides for a data processing system within an electronic device, the data processing system comprising an application node including a first processor configured to execute a first operating system, the application node to enable execution of a user application; a platform node including a second processor configured to execute a second operating system, the platform node to manage a set of input/output devices within the electronic device; and an interconnect to enable communication between the application node and the platform node, the interconnect established over a virtual bus connection between a device coupled with the platform node and the user application on the application node, the application node and the platform node to establish a bi-directional network connection over the interconnect, the application node and the platform node to establish a multi-channel inter-process communication link between a first process on the first processor and a second process on the second processor, the multi-channel inter-process communication link including at least a default channel and a reply channel.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Figure 1:
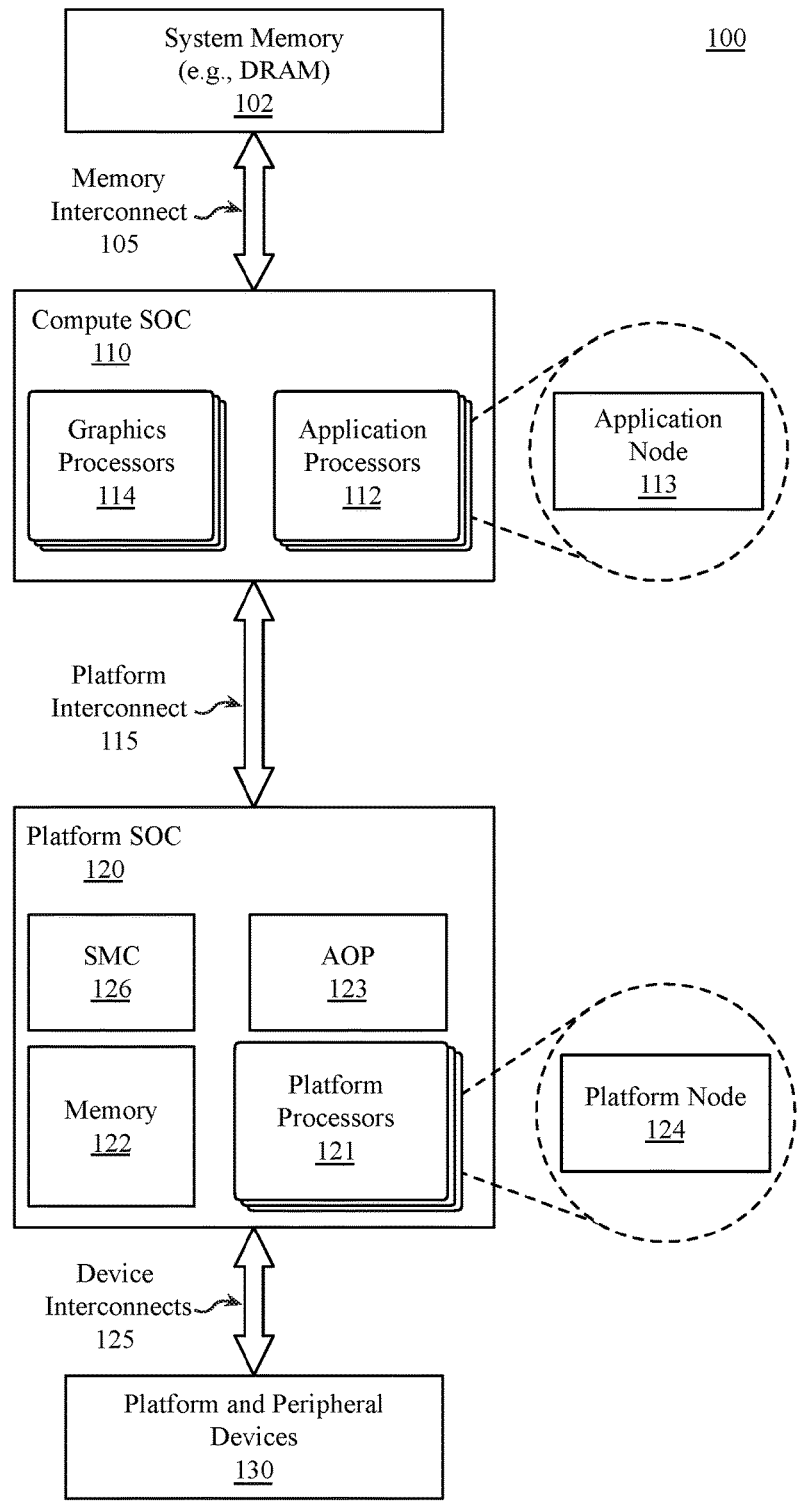
FIG. 1 illustrates a data processing system having multiple hardware processing and operating systems, according to an embodiment.

A compound computing system having an application processor and a platform processor can divide system responsibilities between the two processors. The platform processor is a multicore processor that manages system peripherals and I/O devices in a secure manner. The application processor is a multicore processor that provides execution resources to user applications executing on the computing device. The application processor and the platform processor execute separate independent but intraoperative operating systems. The application processor and platform processor can have separate instruction set architectures and/or microarchitectures. The application processor and the platform processor communicate via a message passing system established over an internal system bus or interconnect fabric. The message passing system can be implemented using a network protocol that uses an internal system bus, such as a PCIe bus, as a physical layer connection. The network protocol creates a single, bi-directional connection between the application processor and the platform processor. To enable the various services exposed by the platform processor to be efficiently accessed by software executing on the application processor, a more advanced communication mechanism that what is provided by existing networking protocols is desired.

Described herein is an inter-process communication system that facilitates communication between processes executing on the application processor and processes executing on the platform processor. The inter-process communication system enables a single, bi-directional network connection established over an internal bus to be multiplexed into multiple connections, each connecting having per-connection flow control. Data transmission can be performed out-of-band of the default communication channel to enable long duration transfers without blocking the default communication channel.

Additionally, a service discovery mechanism is enabled to allow services provided by a process on a remote processor to be discovered. A rich set of properties can be broadcast, with service discovery mediated via a trusted intermediary, without requiring mutual authentication between clients and servers of authorized services. Capabilities are enforced as to which agents can access which services. Enabling functionality for a given device makes use of services on the application processing system and the platform processing system. A device-wide state machine is enabled and maintain across the application processor and platform processor to synchronize device availability and status. Catalog services are available locally for each processor/operating system. During service discovery, catalogs can be exchanged between processing systems. The catalog exchange enables mutual export of APIs, services, and connection state for devices provided by the various processing systems.

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

FIG. 1 illustrates a data processing system 100 having multiple hardware processing and operating systems, according to an embodiment. In one embodiment, the data processing system 100 includes a system on a chip integrated circuit (compute SOC 110) including a set of application processors 112, and a set of graphics processors 114. The data processing system 100 also includes a platform SOC 120 having a set of platform processors 121, memory 122, an always-on processor (AOP 124), and a system management controller (SMC 126). While the AOP 124 and SMC 126 are illustrated as a component of the platform SOC 120, in some embodiments the AOP 124 and SMC 126 can be located externally to the platform SOC 120 and/or within the compute SOC 110. The platform SOC 120 can couple with platform and peripheral devices 130 of the data processing system 100 via a set of device interconnects 125. The platform and peripheral devices 130 can include data storage devices, input/output devices, sensor devices, and other types of platform and/or peripheral devices. The device interconnects 125 can include various differing types of device interconnects for connecting the various platform and peripheral devices 130, including but not limited to PCI-E, eSPI, or general purpose I/O (GPIO).

In one embodiment, the compute SOC 110 and the platform SOC 120 are coupled via a platform interconnect 115. The platform interconnect 115, in one embodiment, includes multiple physical links including one or more high-speed, high-bandwidth links, such as a peripheral component interconnect bus (e.g., PCIe) and one or more relatively lower speed interconnects (e.g., eSPI). In one embodiment, different links within the platform interconnect 115 can be associated with specific processors or components within the compute SOC 110 and platform SOC 120. For example, one or more application processors 112 can communicate with the SMC 126 via an eSPI bus, while the application processors 112 can communicate with the platform processors 121 via PCIe.

The compute SOC 110 can couple with system memory 102 via a memory interconnect 105. In various embodiments, the system memory 102 can include one or more of various types of memory, including, but not limited to, dynamic random-access memory (DRAM). The graphics processors 114 can perform computations and rendering for three-dimensional graphics and provide images for a graphical user interface. The graphics processors 114 can also act as a co-processor for the application processors 112. For example, the graphics processors 114 can perform general-purpose compute operations (e.g., via compute shader programs, etc.) for machine-learning tasks.

The SMC 126, in one embodiment, is a microcontroller or microprocessor configured to perform system management operations, including power management operations. The SMC 126 is not externally programmable and thus is not corruptible by malware or malicious attackers. The SMC 126 can be used to verify boot code for a processor within the system before allowing the processor to boot. The SMC 126 can also be used to relay messages and commands between processors when the system is in a degraded state. The platform SOC 120 also includes memory 122, which can be DRAM memory that can be similar to the system memory 102 used by the compute SOC 110, although the memory 122, in differing embodiments, can also be lower-power or higher-speed memory relative to the system memory 102

The AOP 124 within the platform SOC 120 is an always-on processor that is a lower power processor that can remain powered when the remainder of the data processing system 100 is powered off. The AOP 124 can be configured to power up other components while keeping the application processors 112 powered down, in order to enable the system to perform tasks assigned to the other components. In one embodiment, the AOP 124 can be configured as a co-processor that can perform a limited number of operations for the data processing system 100 before powering up other, higher-power processors. In one embodiment, the AOP 124 can also include separate random-access memory, such as a static random-access memory. In one embodiment, the AOP 124 can also include high-speed non-volatile memory.

In one embodiment, the platform processors 121 include various processing devices that are used to perform system operations and facilitate access to I/O devices for the compute SOC 110. The platform processors 121 can include, but are not limited to a bridge processor that can perform operations for a bridge operating system environment 120 as in FIG. 1, as well as storage processors, audio processors, image processors, video processors, and other processors or co-processors that are used to perform or manage audio, video, and media processing for the system, as well as enable storage functionality and system security services.

In one embodiment, the application processors 112 and the platform processors 121 can each be the same or similar in architecture and microarchitecture. For example, the application processors 112 and platform processors 121 can each be higher-performance or lower power variants of a similar processor, where each processor is configured to execute the same instruction set architecture. In one embodiment, the application processors 112 and the platform processors 121 can differ in architecture and/or microarchitecture, such that program code compiled for execution on the platform SOC 120 may not be directly executable on the compute SOC 110, although translation libraries may enable the exchange and execution of specific binaries or object files. For example, in one embodiment the application processors 112 can be configured to execute instructions compiled for a variant of the Intel instruction set architecture (e.g., x86-64), while the platform processors 121 can be configured to execute a variant of the advanced RISC machines (ARM) instruction set architecture (e.g., ARM-64).

In one embodiment, a software communication architecture enables communication between processes executing on the application processors and processes executing on the platform processors. An operating system executing on the application processor 112 can configure, or be configured as, an application node 113. A separate operating system executing on the platform processors 121 can configure, or be configured as, a platform node 123. The application node 113 and the platform node 123 can establish a multi-level networking stack over one or more bi-directional network connections established using the platform interconnect as a physical medium. The application node 113 and the platform node 123 can establish the one or more bi-directional network connections transport control protocol (TCP), although other ordered and error-checked networking protocols can also be used.

In one embodiment, the application node 113 and the platform node 123 can establish a messaging protocol that enables stream multiplexing over each of the one or more bi-directional communication links. The messaging protocol enables multi-channel communication for each link and enables messages to be transmitted without requiring per-request allocation of dedicated resources. In one embodiment, out-of-band resource transfer is enabled, enabling a data transmission, such as a file transfer, to be configured via one channel of the data stream while the bulk of the data is transmitted over a second channel, leaving the original channel free to handle additional message transfers. In one embodiment, differing ordering semantics can be enabled for each message type. For example, initial messages can be transmitted in an ordered manner, while replies to a message can be performed out of order, allowing a reply to a previously received message to be transmitted out of order. The features of the messaging protocol described can be used to enable the extension of inter-process communication protocols over the networking link, allowing established, inter-process communication protocols to be used to facilitate communication between a process on one of the platform processors 121 with a process on one of the application processors 112. For example, in one embodiment, the XPC inter-process communication protocol is enabled communication between processes on the platform processors 121 and processes on application processors 112.

Figure 2A:
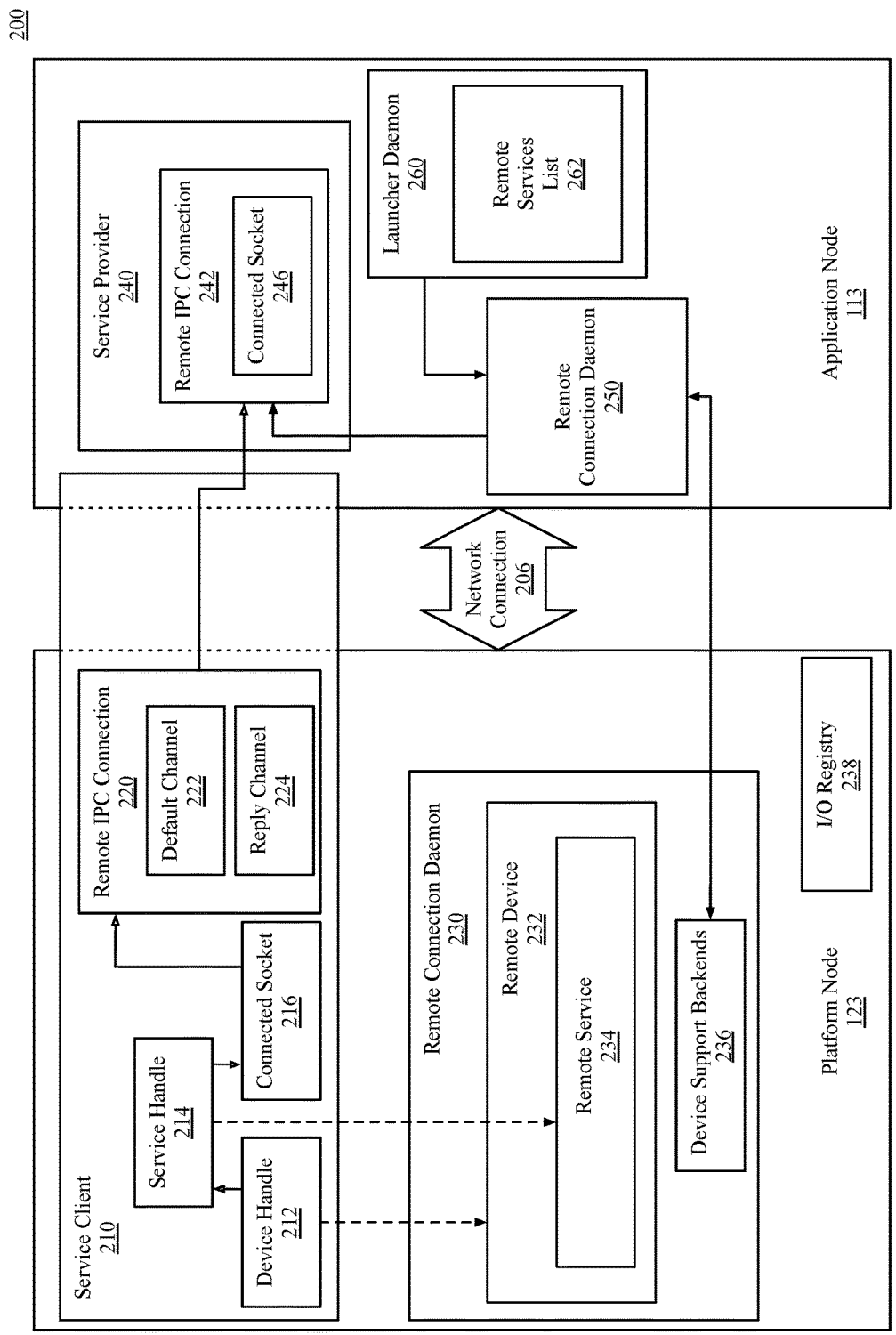
FIG. 2A illustrates an architecture for a remote inter-process communications protocol, according to embodiments described herein.

FIG. 2A illustrates an architecture 200 for a remote inter-process communications protocol, according to embodiments described herein. In one embodiment, as described above, the platform node 123 can communicate with an application node 113 over a network connection 206 established over a platform interconnect, such as the platform interconnect 115 of FIG. 1. In one embodiment, the platform node 123 includes a service client 210 and a remote connection daemon 230. The application node 113 includes a service provider 240, remote connection daemon 250, and a launcher daemon 260. The platform node 123 and the application node 113 are connected via a network connection 206, such as a TCP network connection, over which the multi-channel messaging protocol can communicate. The remote connection daemon 230 of the platform node 123 and the remote connection daemon of the application node 113 can coordinate to establish a multi-channel inter-process communication link. Remote connection daemon 230 includes a remote device module 232, which includes a remote service module 234. Remote connection daemon 230 also includes a set of device support backends 236, one backend for each device to be attached. In one embodiment, remote connection daemon 250 can include similar elements that can perform similar functionality.

In one embodiment, the remote device module 232 can be associated with a device driver executing on the platform node 123. The remote inter-process communications protocol described herein can enable the device driver executing on the platform node 123 to communicate with a device driver, or another software module executing on the application node 113. Such connection can enable a device that is physically coupled with the platform node 123, or one of the platform processors (e.g., platform processor 121), to appear as though the device is physically coupled with the application node 113, or one of the application processors (e.g., application processors 112).

In one embodiment, the platform node 123 includes an I/O registry 238. The I/O registry 238 can maintain a list of network communication module interface numbers and addresses for various devices in the platform node 123 and in the application node 113. A link-local address for those devices can be derived based on the interface number of address. The link-local address for a device can be used to enable a channel to communicate with the device via the network connection 206 between the platform node and the application node 113. In one embodiment, the active or inactive state for an interface can be maintained in the I/O registry 238.

In one embodiment, the device support backends 236 facilitate a service list exchange, such that when a remote device connection attempt is made, remote connection daemon 230 will begin listening for a service associated with a device, along with a port number at which the device is connected. Remote connection daemon 230 can then send a service list and associated port numbers to remote connection daemon 250. A device handle 212 and service handle 214 can be used to establish a device and service connection via a set of connected sockets 216, 246 associated with remote IPC connections 220, 242 on the respective nodes, allowing a service client 210 on the platform node 123 to communicate with a service provider 240 on the application node 113. In one embodiment, the launcher daemon 260 is configured to launch services in response to event triggers. The launcher daemon 260 can maintain a remote services list 262 for services the launcher daemon 260 expects to enable via the application node 113. Services that are enabled via the application node 113 will then be available to applications executing on the application processor.

Inter-process communication between the service client 210 and the service provider 240 can be performed via the remote IPC connections 220, 242 over multiple channels. For example, a default channel 222 can be used to transmit a message between the service client 210 and the service provider 240. Each message can have a message format that includes a magic number, a version field, a type field, and a flag field. If a transmitted message expects a reply, a flag in the flags field can be set that indicates that the message wants a reply. A message that is a reply to a previous message can include a reply identifier and a flag that indicates that the message is a reply. Replies to a previous message can be sent over the reply channel 224, which enables replies to be transmitted without being queued behind messages in the default channel 222, reducing the occurrence of head-of-line blocking for replies. Each of the remote IPC connections 220, 242 include at least a default channel 222 and a reply channel 224, although other channels can be created. For example, a file transfer channel or a raw byte stream can be established.

In one embodiment, the initiator of a connection can open both an initial connection stream (e.g., default channel 222) and a reply message stream (e.g., reply channel 224). The initial message on a stream (e.g., "HELO") can indicate the purpose of a stream (e.g., type) and a stream identifier. The default channel 222 and reply channel 224 can be used to convey inter-process communication messages. Various other types of streams can be created to convey other types of data including byte streams, file transfer streams, control streams, etc. For example, a byte stream can relay data associated with another stream-oriented network protocol or serial device. A file transfer stream can be used specifically for streaming file data between processes. A file transfer can occur by sending a stream identifier via a byte stream, where the stream identifier identifies a file transfer stream over while file data will be streamed, enabling relatively longer transfers to be performed out-of-band of a primary message transfer stream, while replies to previous messages can be sent and received over a separate stream from initial messages and file transfers, preventing data transfers from being blocked by queued messages of a different types. In one embodiment, separate streams of the same type can be opened over a connection, enabling a single connection to have a large number of separate concurrent streams.

Figure 2B:
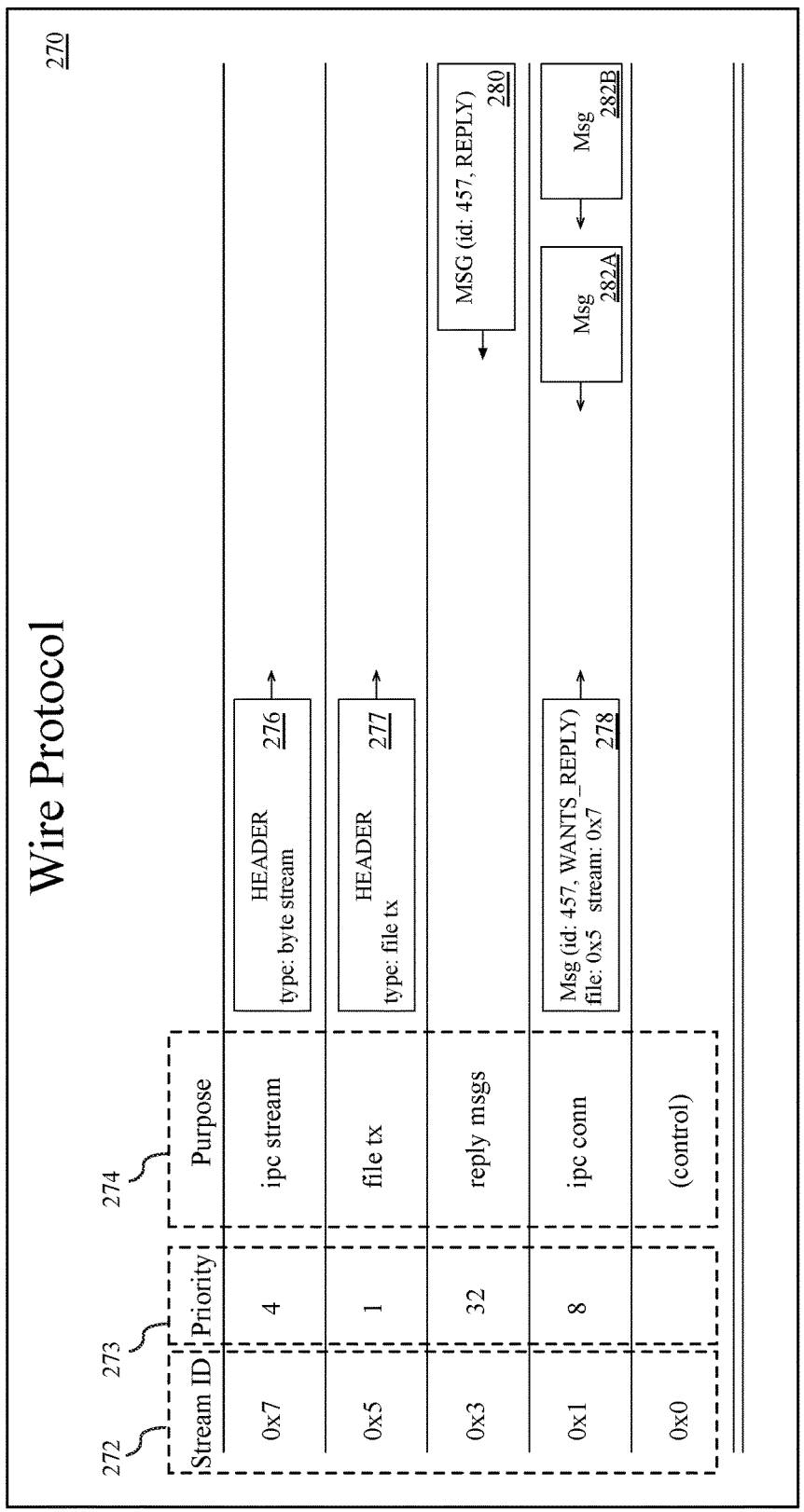
FIG. 2B illustrates a wire protocol for remote inter-process communication, according to an embodiment.

FIG. 2B illustrates a wire protocol 270 for remote inter-process communication, according to an embodiment. Multiple channels can be created between endpoints to facilitate the establishment of inter-process communication links. A single remote IPC connection can include multiple streams of serialized messages that flow in a bi-directional manner. In one embodiment, each channel has associated descriptors including a stream identifier (stream ID 272), a priority 273, and a purpose 274. The stream ID 272 is an identification value associated with the channel. The priority 273 specifies a priority for the stream and can be used to prioritize the handling of messages for the various streams over the network connection 206 that links the service client 210 with the service provider 240. In one embodiment, the initiator of a connection can open both the initial connection stream and a reply message stream, sending a "HELO" message on each stream. Both endpoints can place a stream in a half-closed state when no data is queued to be transferred over the stream.

The initial "HELO" message on a stream can be used to indicate the purpose of the stream and a stream ID. The "HELO" message can be sent using a header message type, as exemplified by message 276 (type: byte stream) and message 277 (type: file transfer). The byte stream and file transfer channels can be associated with an IPC connection (e.g., stream ID 272 of 0×1). A message 278 can be sent over the IPC connection that specifies additional streams over which data can be transferred (e.g., 0×5 for file transfer, 0×7 for byte stream). Message 278 can indicate that a reply should be sent in response (WANTS_REPLY). A message 280 can be sent as a reply to message 278 over a channel that is dedicated for reply messages (e.g., stream ID 272 of 0×3). A message sent as a reply message can include the message ID of the original message (e.g., id 457), as well as a flag that indicates that the message is a reply (e.g., REPLY as in message 280). In one embodiment, each channel is bi-directional, such that messages from both endpoints can be sent along a channel. For example, message 282A and message 282B can be sent over the IPC connection channel (stream ID 0×1) from one endpoint, while other messages (e.g., message 278) can be sent by the other endpoint on the channel.

Figure 2C:
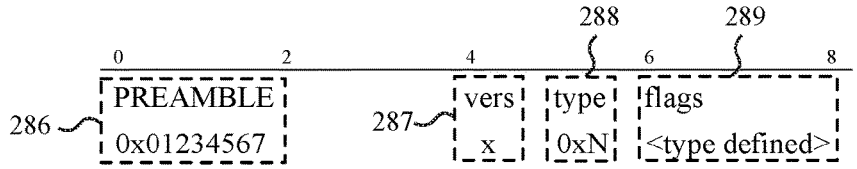
FIG. 2C illustrates a message format, according to embodiments described herein.

FIG. 2C illustrates a message format 285, according to embodiments described herein. The message format 285 specifies various fields and options that can be specified within messages used to relay inter-process communication messages over a network interface established between the service client 210 and the service provider 240. An initial set of fields for a message can occupy the first eight bytes of the message, with additional fields including a message length 292 and message ID 293. In one embodiment, a message payload 294 is included after the message ID 293.

In one embodiment, the message format 285 includes a preamble 286, a version field 287, a type indicator 288, and a set of flags 289. The preamble 286 is a pre-defined sequence of values that identifies the data unit as a message having the illustrated message format 285. In some implementations, the preamble 286 can be referred to as a 'magic number.' In one embodiment, the preamble 286 is a two-byte sequence of numbers, although the specific length can vary. The version field 287 specifies the message version in use and is incremented when new type values are added. To maintain proper message serialization, message version pre-negotiation is performed to ensure endpoints communicate using compatible message format versions. The type indicator 288 can be used to specify a type for the message, where the specific supported types can vary based on the supported message format version. In one embodiment, the type indicator 288 includes a header 290A, an IPC serialized message 290B, or a ping 290C.

A header 290A message type can be used for a "HELO" message to establish a stream. Where the message is a header 290A, the message ID 293 contains a stream ID and the flags 289 specify the stream type. Exemplary stream types include byte streams, file transfer streams, IPC connection streams, and IPC reply streams. An IPC serialized message 290B is a general-purpose message type that can be used to transfer data associated with IPC communication channels. The flags 289 can be used to specify whether a message wants a reply (WANTS_REPLY 291A) or is a reply (IS_REPLY 291B). The ping 290C message type and a message payload 294 can be used to check the operational status of an endpoint. In response to a ping 290C received at an endpoint, the endpoint should reply with a return ping 290C, which should include the same data received in the message payload 294.

In various embodiments, the message payload 294 can include different types of payload data, including IPC specific data. In one embodiment, the message payload 294 can be used to carry data objects that are specific to the type of inter-process communication operations facilitated via the transferred messages. In one embodiment, elements of the message payload 294 can be encoded using an encode format known by and/or determined by the processes communicating via the IPC system. In one embodiment, the encode format for elements of the message payload 294 can be determined by the IPC system.

Figure 3A:
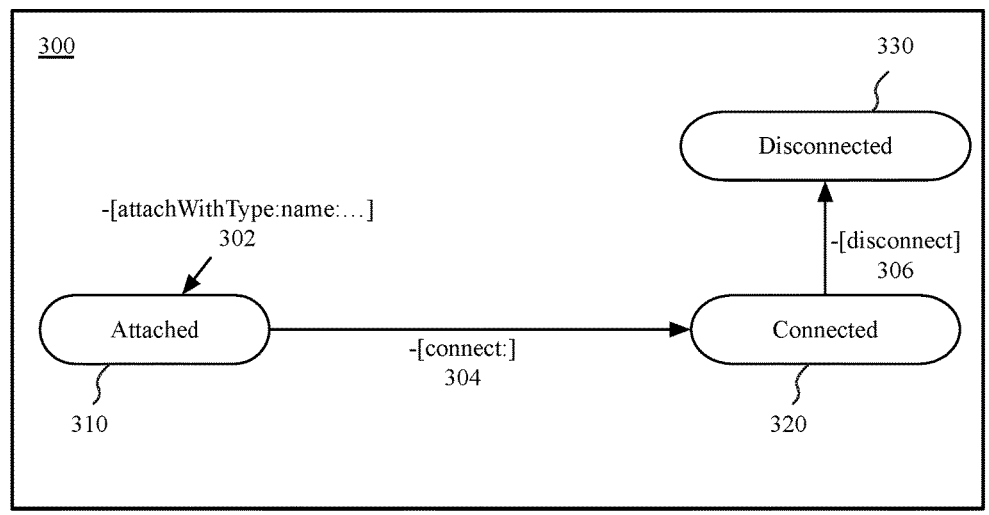
FIG. 3A-3B illustrate logical device states and I/O architecture, according to an embodiment.
Figure 3B:
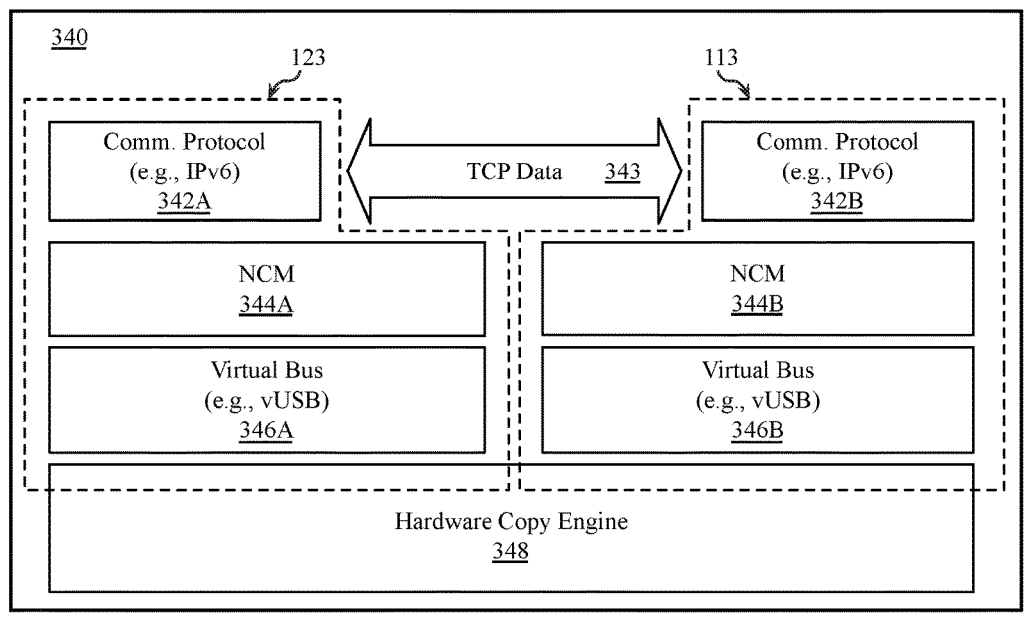

FIG. 3A-3B illustrate logical device states and I/O architecture, according to an embodiment. FIG. 3A shows a state diagram 300 for a device within the processing systems provided by embodiments described herein. FIG. 3B shows an I/O architecture 340 for communication between processing nodes, according to embodiments described herein.

As shown in FIG. 3A, a device can have logical device states including an attached state 310, a connected state 320, and a disconnected state 330. A device can enter an attached state 310 in response to receiving an attach message 302 from a device support backend from the set of device support backends 236 shown in FIG. 2A. In one embodiment the attach message 302 specifies a human readable name for the device. The attach message 302, or a subsequent message from the device backend, can specify a device type for the device and set various properties for the device. For internally installed devices of a computing device that have a persistent physical connection, the transition to the attached state 310 can occur in response to a virtual attachment to a virtual bus, rather than a newly created physical attachment.

A connect process 304 can be performed on the device to transition the device into the connected state 320. The device, once in the connected state 320, can be reached over an internal network connection (e.g., network connection 206 as in FIG. 2A) as described herein. In one embodiment, the device backend can create a socket connection for the device and provide the socket connection to a remote daemon. This socket connection can be used to coordinate an exchange of service lists associated with the device. The remote inter-process communication system described herein can be used to facilitate the advertisement and discovery of services offered over the communication system. A rich expression of services and properties is enabled using a unified framework including access control. The system can act as a trusted intermediary that provides authentication services for clients and servers of services advertised, discovered, and facilitated via the remote inter-process communication system.

The device can transition into the disconnected state 330 after a disconnect process 306. The disconnect process 306 can occur in response to the physical removal of a device, if the device is externally attached. An internally attached device can also transition to the disconnected state due to a low-power state transition or a device reset. In one embodiment, once a device is in the disconnected state 330, the device cannot transition back to the connected state 320. Instead, a new logical device is created and transitioned to the attached state 310. In one embodiment, each device has an associated universally unique identifier (UUID) that is associated with the device during system provisioning. The system can maintain a subset of state information for a device across reconnects by tracking the UUID of the device.

As shown in FIG. 3B, the device communication I/O architecture 340 for each of the platform node 123 and application node 113 can include a communication protocol 342A-342B on each node. The communication protocol 342A-342B, in one embodiment, is version 6 of the Internet Protocol (IPv6), although in such embodiment the node-to-node communication between the platform node 123 and application node 113 is performed entirely within the computing device and is not performed over the Internet. Data of the communication protocols 342A-342B can be exchanged on a logic level as transmission control protocol data (TCP data 343) over an inter-node network connection (e.g., network connection 206 as in FIG. 2A).

In one embodiment, each of the platform node 123 and the application node 113 includes a network communication module (NCM 344A-344B) that acts as a lower-level network interface for each node. Each NCM 344A-344B can have an associated interface number and address. In one embodiment, the address of each NCM 344A-344B is a media access control (MAC) address. In such embodiment, the MAC address of an NCM 344A-344B, along with the associated interface number, can be used to generate a link-local address that can be used for communication via IPv6.

In one embodiment, each NCM 344A-344B interfaces with a virtual bus 346A-346B, which is a virtualized instance of a data bus that enables each NCM 344A-344B to appear as a virtual device. In one embodiment, each virtual bus 346A-346B is a virtual universal serial bus (vUSB), which can be used to abstract a diversity of physical device interconnects. As the devices physically reside within the same computing device, the underlying raw-data transfer for data buffers of the platform node 123 and the application node 113 can be performed by a hardware copy engine 348. The hardware copy engine 348 can facilitate data transfer between nodes without requiring the use of host processor resources or other direct memory access (DMA) controllers.

Embodiments described herein enable presentation of a universal connection interface for system devices, without regard to the physical interconnect that is used to connect the device to the system. For example, one embodiment enables the presentation of a platform connected device as a USB device, although devices can be presented as any type of device by modifying the underlying firmware interfaces. In one embodiment, a bridging driver is employed that interacts with host controller firmware that enables translation between the connection protocol of the peripheral to a host controller that can be interacted with via a universal device protocol.

Figure 4:
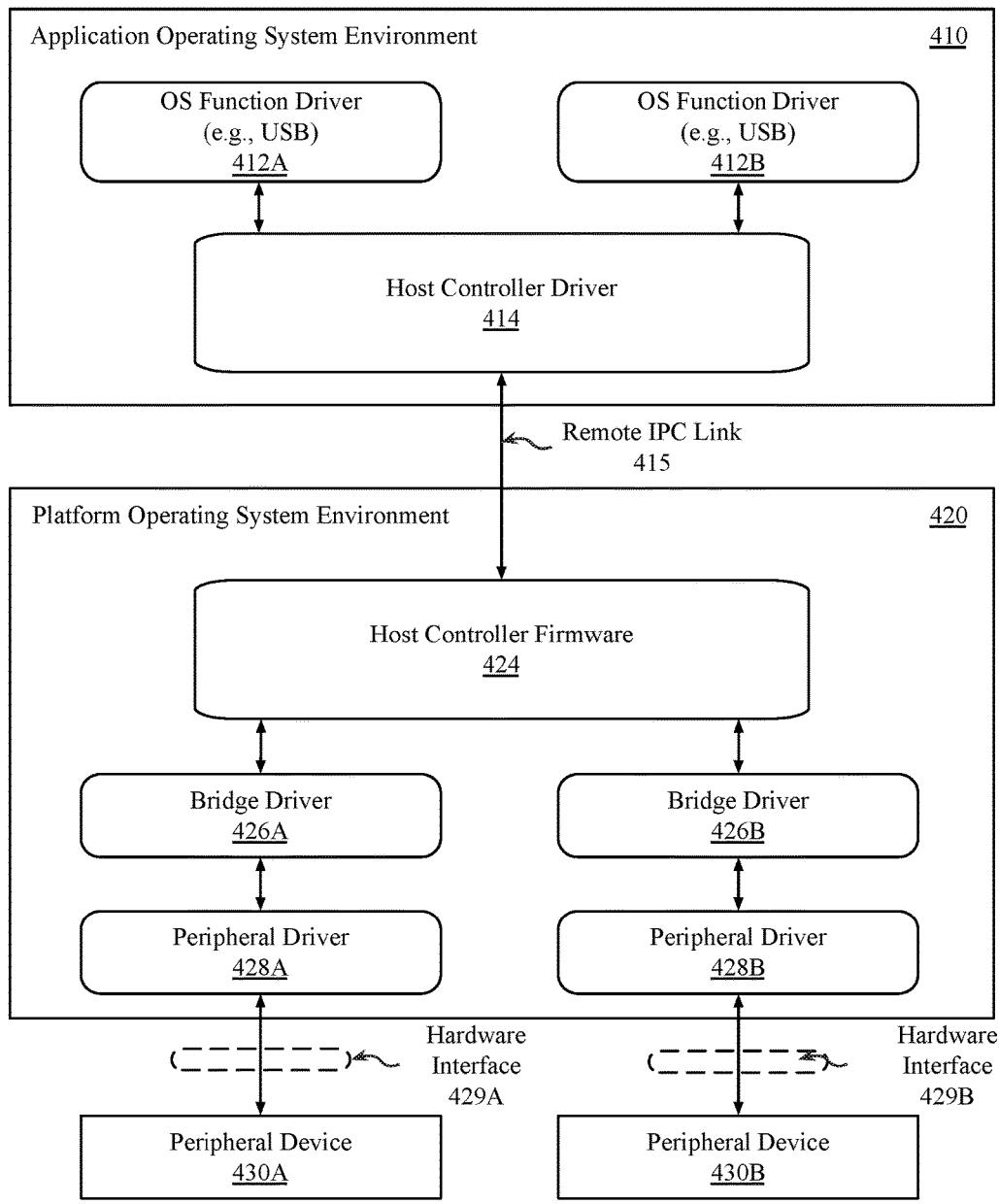
FIG. 4 illustrates an I/O system, according to an embodiment.

FIG. 4 illustrates an I/O system 400, according to an embodiment. In one embodiment the I/O (input/output) system 400 includes an application operating system environment 410 and a platform operating system environment 420. The application operating system environment 410 can be implemented as a version of the application node 113 as described herein, while the platform operating system environment 420 can be implemented as a version of the platform node 123 as described herein. Communication between the application operating system environment 410 and the platform operating system environment 420 can be enabled over a remote IPC link 415. The remote IPC link 415 allows non-memory mapped transport mechanisms to be used and allows transport-agnostic communication between the host controller environment and the application operating system environment 410. The remote IPC link 415 can be established over a network connection established between the application operating system environment 410 and the platform operating system environment 420, such as the network connection 206 as in FIG. 2A.

The application operating system environment 410 includes a set of OS function drivers 412A-412B in communication with a host controller driver 414. In one embodiment the OS function drivers 412A-412B are USB function drivers, although other protocols can be used. The platform operating system environment 420 includes host controller firmware 424, a set of bridge drivers 426A-426B, and a set of peripheral drivers 428A-428B.

In one embodiment the components of the application operating system environment 410 are software modules that execute on a processor of the data processing system. The host controller driver 414 may be a kernel level driver or a user level driver of the operating system and can enable the operating system to communicate with a host controller, via the host controller firmware 424, and enable the peripheral devices 430A-430B to interact with the operating system and applications of the data processing system as USB devices. The OS function drivers 412A-412B are unaware of the implementation details of the host controller accessed via the host controller driver 414 and existing USB drivers can be used to control the peripheral devices 430A-430B.

In one embodiment, within the platform operating system environment 420, the set of peripheral drivers 428A-428B communicate with a set of peripheral devices 430A-430B via a set of hardware interfaces 429A-429B. The bridge drivers 426A-426B enable interface translation between the peripheral drivers 428A-428B and the host controller firmware 424. A properly implemented bridge driver for each peripheral can enable communication between any type of peripheral and the host controller firmware 424. Peripheral device 430A and peripheral device 430B can be different types of devices (e.g., keyboard and touchpad, camera and fan controller, etc.) and can communicate via different communication protocols (e.g., serial peripheral interface (SPI), general-purpose input/output (GPIO), Inter-Integrated Circuit (I2C), Universal Asynchronous Receiver/Transmitter (UART), etc.). Thus, hardware interface 429A can differ from hardware interface 429B in physical form factor and communication protocol.

Figure 5A:
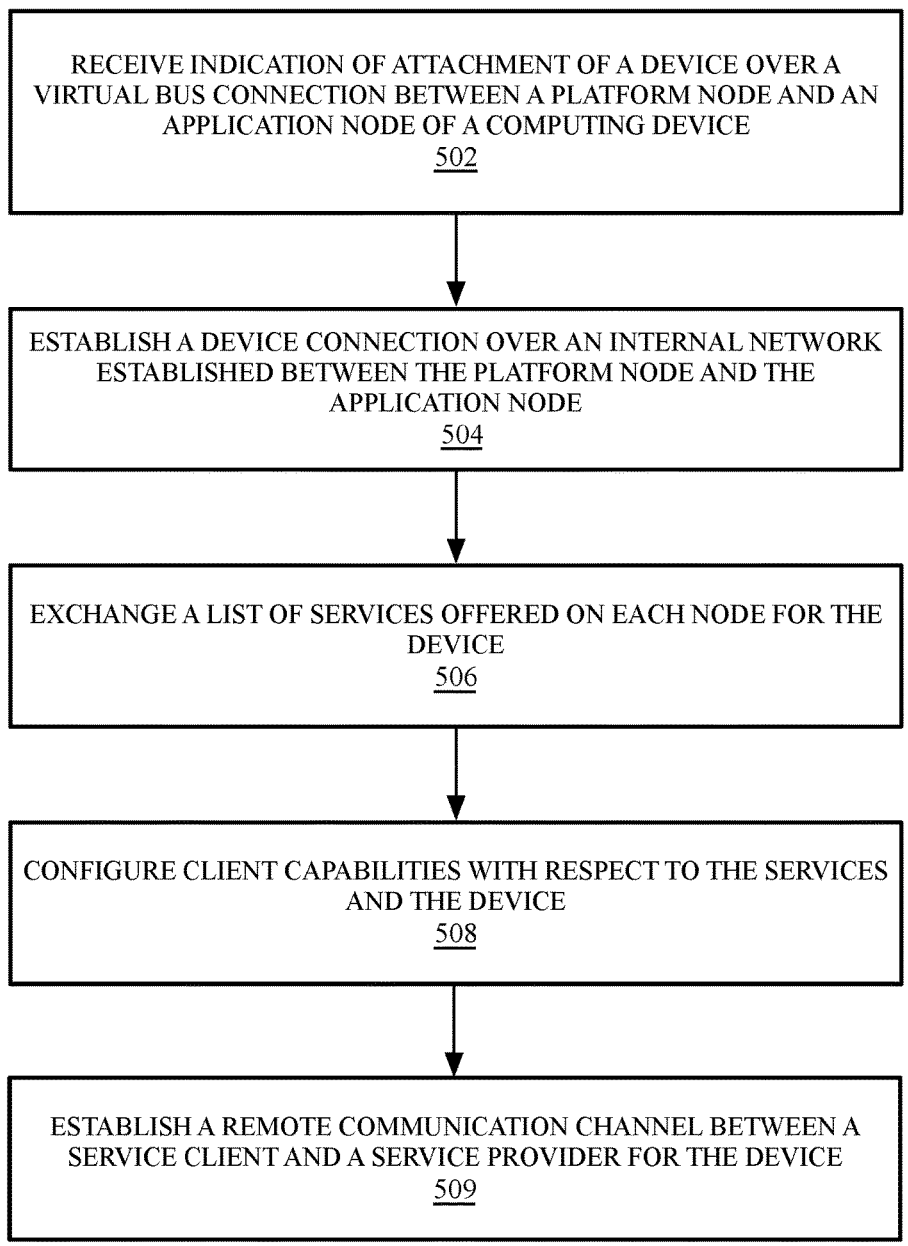
FIG. 5A-5B illustrate methods of establishing an inter-node connection for inter-process communications, according to embodiments described herein.
Figure 5B:
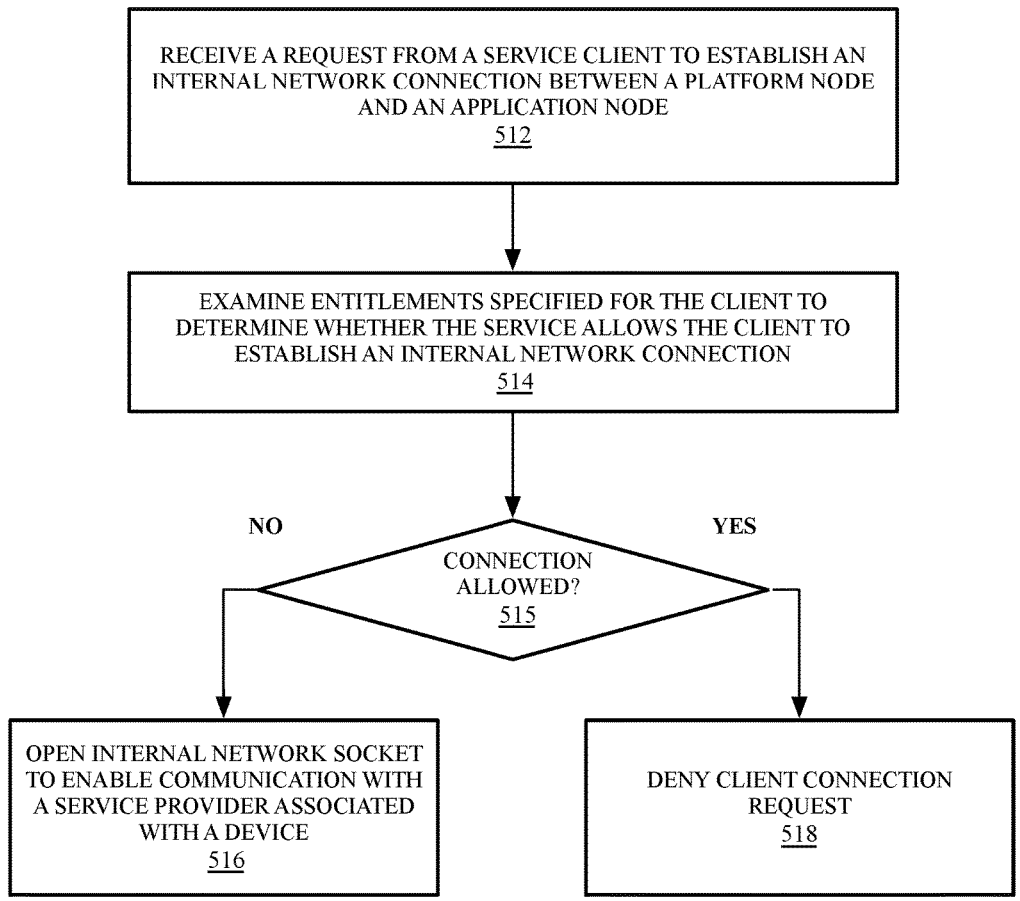

FIG. 5A-5B illustrate methods of establishing an inter-node connection for inter-process communications, according to embodiments described herein. FIG. 5A illustrates a method 500 of establishing a connection for inter-process communication. FIG. 5B illustrates a method 510 of gating connection attempts by a client on a computing device.

As shown in FIG. 5A, in one embodiment, method 500 includes to receive indication of attachment of a device over a virtual bus connection between a platform node and an application node of a computing device, as shown at block 502. As shown at block 504, method 500 includes to establish a device connection over an internet network established between the platform node and the application node. As shown at block 506, method 500 includes to exchange a list of services offered on each node for the device. As shown at block 508, method 500 includes to configure client capabilities with respect to the services and the device. As shown at block 509, method 500 includes to establish remote communication channels between a service client and a service provider for the device. Client capabilities can determine whether a client can open new sockets to a device or connection port associated with the device. The ability for the client to open a socket enables the client to perform a lazy-connect (e.g., deferred connection) or a reconnect to the device.

As shown in FIG. 5B, a method 510 can performed to determine whether a client can initiate a connection. By default, only a remote connection daemon (e.g., remote connection daemon 230 or remote connection daemon 250 in FIG. 2A) can open a socket for a connection.

The method 510 includes to receive a request from a client of a service to establish a connection over an internal network between a platform node and an application node, as shown at block 512. As shown at block 514, the method 510 includes to examine entitlements specified for the client to determine whether the service allows the client to establish an internal network connection. If, as shown at block 515, the client is allowed to establish a connection, the client can open an internal network socket to enable communication with a service provider associated with a device, as shown at block 516. Otherwise, the method 510 includes to deny the client connection request, as shown at block 518. In one embodiment, once an IPC connection is established for a client, the client can be provided device and service handles, which identify connections to IPC endpoints established via a remote daemon. The client can send an IPC message to request the service provider to provide the client the capability to open new sockets to a device.

Exemplary API Overview

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component.

There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 6:
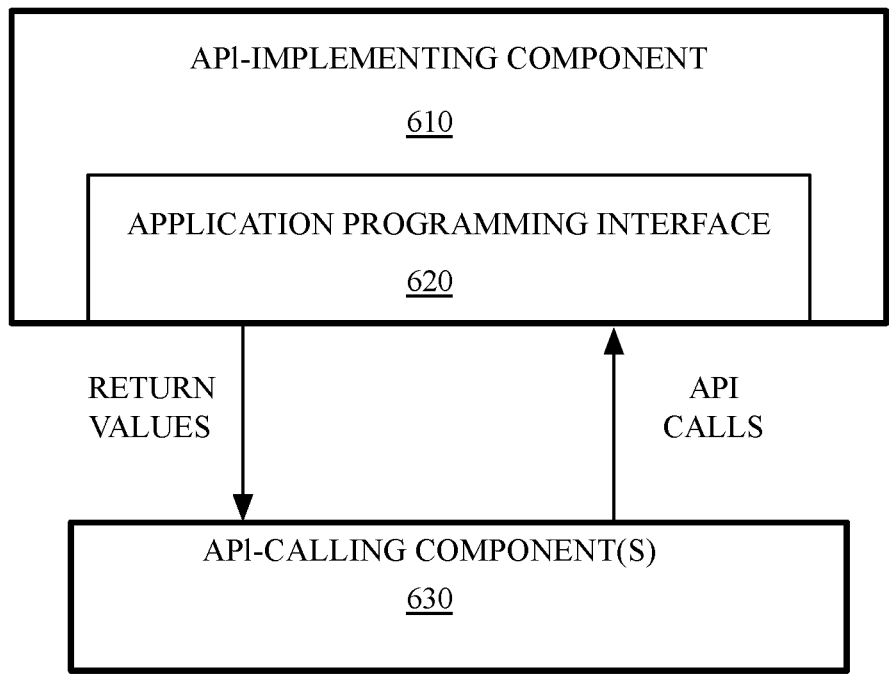
FIG. 6 is a block diagram illustrating an API architecture, which may be used in some embodiments described herein.

FIG. 6 is a block diagram illustrating an API architecture 600, which may be used in some embodiments described herein. The API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 6 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 7A:
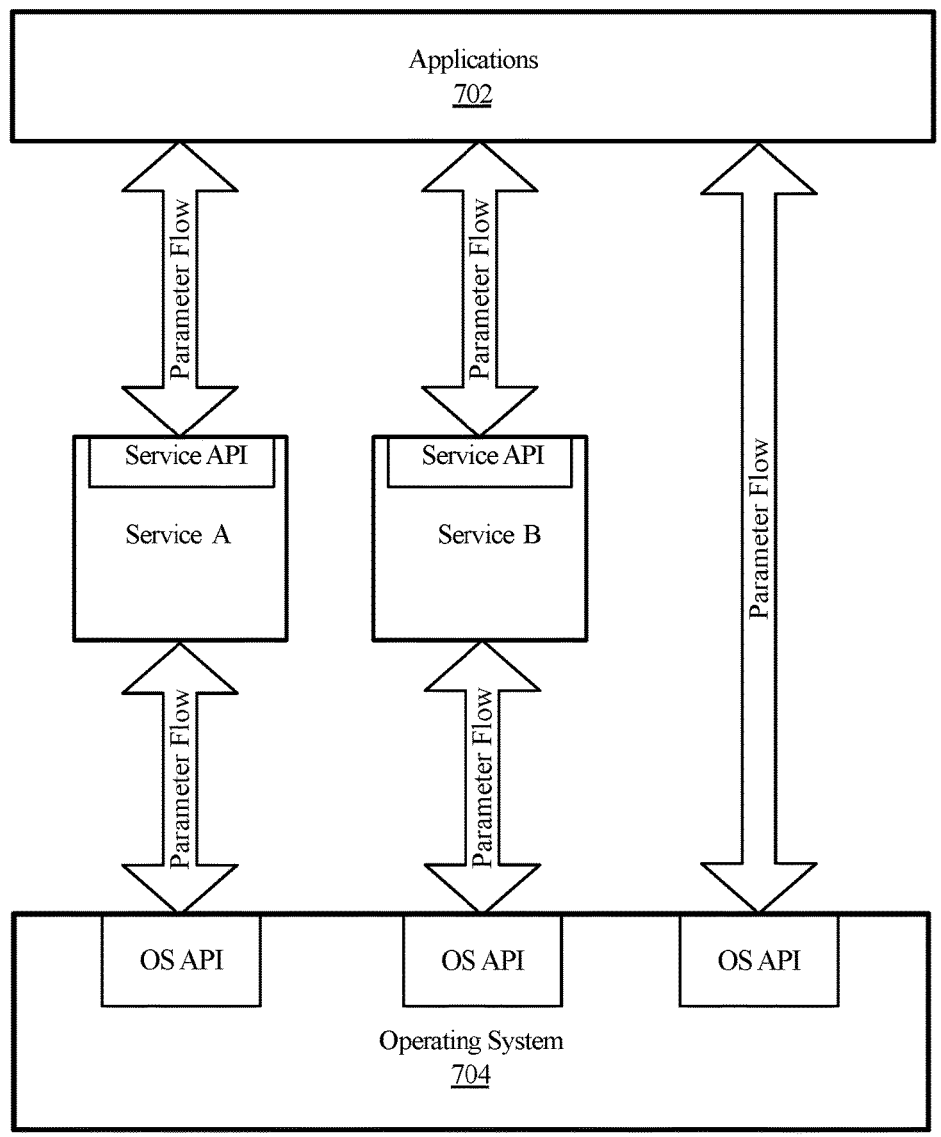
FIG. 7A-7B are block diagrams of API software stacks according to embodiments.
Figure 7B:
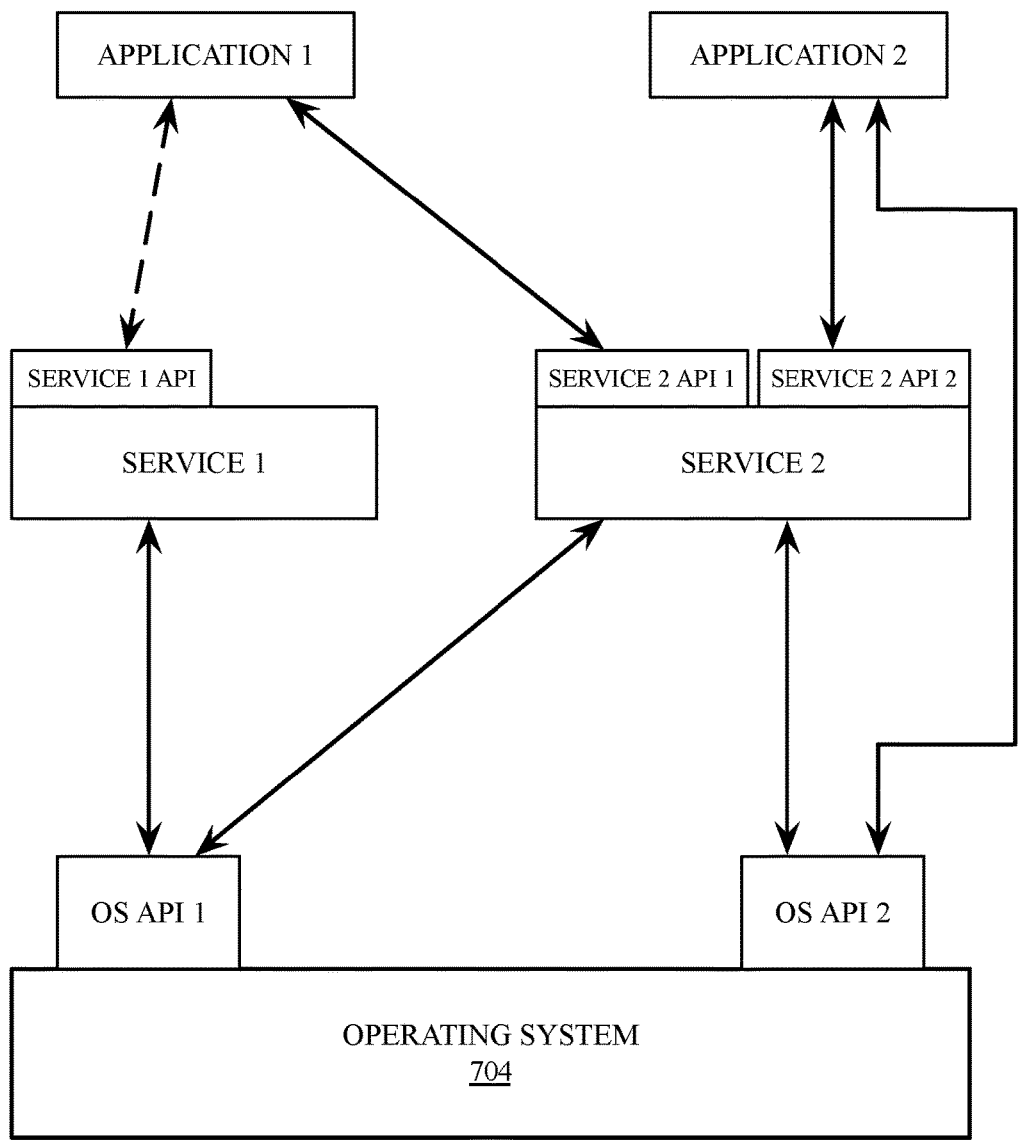

FIG. 7A-7B are block diagrams of API software stacks 700, 710, according to embodiments. FIG. 7A shows an exemplary API software stack 700 in which applications 702 can make calls to Service A or Service B using Service API and to Operating System 704 using an OS API. Additionally, Service A and Service B can make calls to Operating System 704 using several OS APIs.

FIG. 7B shows an exemplary software stack 710 including Application 1, Application 2, Service 1, Service 2, and Operating System 704. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Device Architectures

Figure 8:
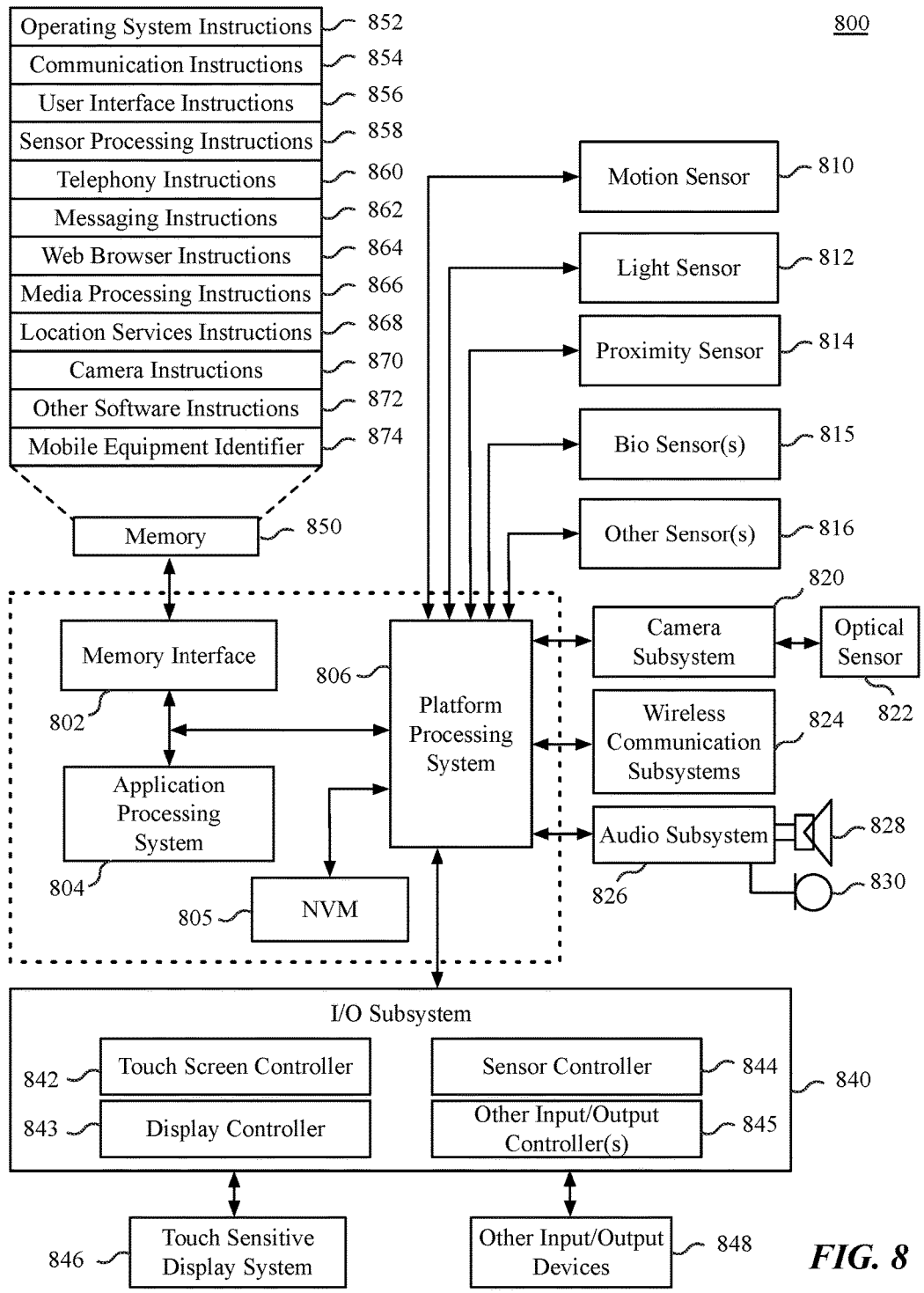
FIG. 8 is a block diagram of a computing device architecture, according to an embodiment.

FIG. 8 is a block diagram of a computing device architecture 800, according to an embodiment. The computing device architecture 800 includes a memory interface 802, a processing system 804, and a platform processing system 806. The platform processing system 806 can implement secure peripheral access and system authentication according to embodiments described herein. The various components can be coupled by one or more communication buses, fabrics, or signal lines. The various components can be separate logical components or devices or can be integrated in one or more integrated circuits, such as in a system on a chip integrated circuit. The processing system 804 may include multiple processors and/or co-processors. The various processors within the processing system 804 can be similar in architecture or the processing system 804 can be a heterogeneous processing system. In one embodiment, the processing system 804 is a heterogeneous processing system including one or more data processors, image processors and/or graphics processing units.

The memory interface 802 can be coupled to memory 850, which can include high-speed random-access memory such as static random-access memory (SRAM) or dynamic random-access memory (DRAM). The memory can store runtime information, data, and/or instructions are persistently stored in non-volatile memory 805, such as but not limited to flash memory (e.g., NAND flash, NOR flash, etc.). Additionally, at least a portion of the memory 850 is non-volatile memory. The platform processing system 806 can facilitate the communication between the processing system 804 and the non-volatile memory.

Sensors, devices, and subsystems can be coupled to the platform processing system 806 to facilitate multiple functionalities. For example, a motion sensor 810, a light sensor 812, and a proximity sensor 814 can be coupled to the platform processing system 806 to facilitate the mobile device functionality. Other sensors 816 can also be connected to the platform processing system 806, such as a positioning system (e.g., GPS receiver), a temperature sensor, a biometric sensor, or other sensing device, to facilitate related functionalities. A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

In one embodiment, the platform processing system 806 can enable a connection to communication peripherals including one or more wireless communication subsystems 824, which can include radio frequency receivers and transmitters and/or optical (e.g., infrared) receivers and transmitters. The specific design and implementation of the wireless communication subsystems 824 can depend on the communication network(s) over which a mobile device is intended to operate. For example, a mobile device including the illustrated computing device architecture 800 can include wireless communication subsystems 824 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 824 can provide a communications mechanism over which a client browser application can retrieve resources from a remote web server. The platform processing system 806 can also enable an interconnect to an audio subsystem 826, which can be coupled to a speaker 828 and a microphone 830 to facilitate voice-enabled functions, such as voice recognition, voice replication, digital recording, and telephony functions.

The platform processing system 806 can enable a connection to an I/O subsystem 840 that includes a touch screen controller 842 and/or other input controller(s) 845. The touch screen controller 842 can be coupled to a touch sensitive display system 846 (e.g., touch screen). The touch sensitive display system 846 and touch screen controller 842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 846. Display output for the touch sensitive display system 846 can be generated by a display controller 843. In one embodiment, the display controller 843 can provide frame data to the touch sensitive display system 846 at a variable frame rate.

In one embodiment, a sensor controller 844 is included to monitor, control, and/or processes data received from one or more of the motion sensor 810, light sensor 812, proximity sensor 814, or other sensors 816. The sensor controller 844 can include logic to interpret sensor data to determine the occurrence of one of more motion events or activities by analysis of the sensor data from the sensors.

In one embodiment, the platform processing system 806 can also enable a connection to one or more bio sensor(s) 815. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 815 can include a finger print sensor that captures fingerprint data from the user. In another embodiment, bio sensor(s) 815 include a camera that captures facial information from a user's face. In some embodiments, the bio sensor(s) 815 can maintain previously captured biometric data of an authorized user and compare the captured biometric data against newly received biometric data to authenticate a user.

In one embodiment, the I/O subsystem 840 includes other input controller(s) 845 that can be coupled to other input/control devices 848, such as one or more buttons, rocker switches, thumb-wheel, infrared port, USB port, and/or a pointer device such as a stylus, or control devices such as an up/down button for volume control of the speaker 828 and/or the microphone 830.

In one embodiment, the memory 850 coupled to the memory interface 802 can store instructions for an operating system 852, including portable operating system interface (POSIX) compliant and non-compliant operating system or an embedded operating system. The operating system 852 may include instructions for handling basic system services and for performing hardware dependent tasks. In some implementations, the operating system 852 can be a kernel-based operating system, a micro-kernel-based operating system, or some combination of a kernel and a micro-kernel.

The memory 850 can also store communication instructions 854 to facilitate communicating with one or more additional devices, one or more computers and/or one or more servers, for example, to retrieve web resources from remote web servers. The memory 850 can also include user interface instructions 856, including graphical user interface instructions to facilitate graphic user interface processing.

Additionally, the memory 850 can store sensor processing instructions 858 to facilitate sensor-related processing and functions; telephony instructions 860 to facilitate telephone-related processes and functions; messaging instructions 862 to facilitate electronic-messaging related processes and functions; web browser instructions 864 to facilitate web browsing-related processes and functions; media processing instructions 866 to facilitate media processing-related processes and functions; location services instructions including GPS and/or navigation instructions 868 and Wi-Fi based location instructions to facilitate location based functionality; camera instructions 870 to facilitate camera-related processes and functions; and/or other software instructions 872 to facilitate other processes and functions, e.g., security processes and functions, and processes and functions related to the systems. The memory 850 may also store other software instructions such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. A mobile equipment identifier, such as an International Mobile Equipment Identity (IMEI) 874 or a similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions may be implemented in hardware and/or in software, including in one or more signal processing and/or application specific integrated circuits.

Figure 9:
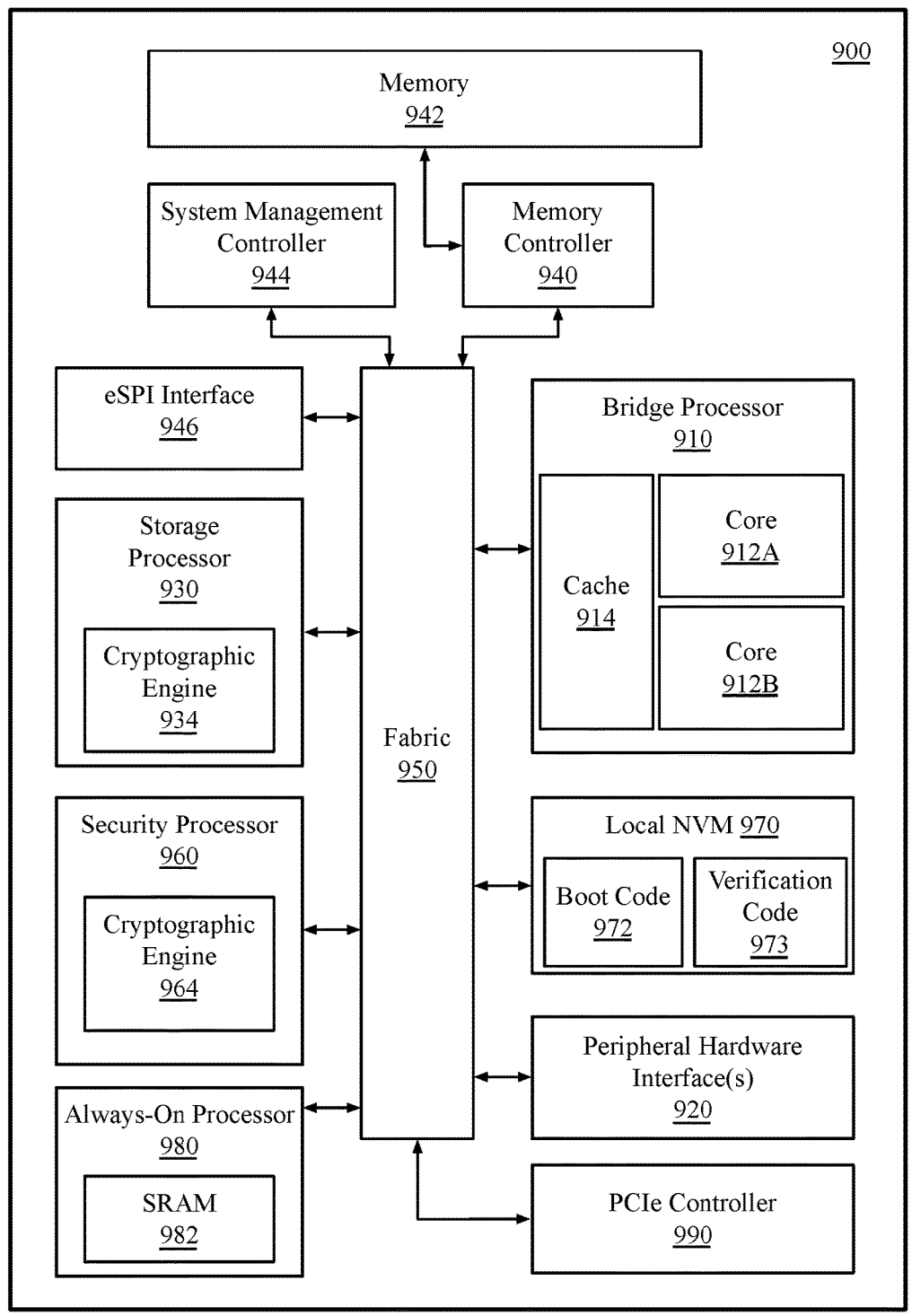
FIG. 9 is a block diagram of a platform processing system, according to an embodiment.

FIG. 9 is a block diagram of a platform processing system 900, according to an embodiment. In one embodiment, the platform processing system 900 is a system on a chip integrated circuit that can be a variant of the platform processing system 806 of FIG. 8. The platform processing system, in one embodiment, includes a bridge processor 910 that facilitates an interface to the various system peripherals via one or more peripheral hardware interface(s) 920. In one embodiment, the platform processing system 900 includes a crossbar fabric that enables communication within the system, although a system bus may also be used in other embodiments. The platform processing system 900 can also include a system management controller 944 and always-on processor 980, which can be variants of the SMC 126 and AOP 123 as in FIG. 1. In one embodiment, the always-on processor 980 can include internal SRAM 982.

The platform processing system 900 can also include an eSPI interface 946, which can be an eSPI slave in communication with an eSPI master in the compute SOC 110 of FIG. 1. The eSPI interface 946 can be used to enable the system management controller 944 to communicate with the compute SOC and other components external to the platform processing system 900. Additionally, the platform processing system 900 can also include a PCIe controller 990 to enable components of the platform processing system 900 to communicate with components of the computing device that are coupled to a PCIe bus within the system.

In one embodiment, the bridge processor 910 includes multiple cores 912A-912B and at least one cache 914. The bridge processor 910 can facilitate secure access to various peripherals described herein, including enabling secure access to camera, keyboard, or microphone peripherals to prevent an attacker from gaining malicious access to those peripherals. The bridge processor 910 can then securely boot a separate and complete operating system that is distinct from the user facing operating system that executes application code for the computing device. The bridge processor 910 can facilitate the execution of peripheral control firmware that can be loaded from local non-volatile memory 970 connected with the processor via the fabric 950. The peripheral firmware can be securely loaded into the memory 942 via a fabric-attached memory controller 940, enabling the bridge processor 910 to perform peripheral node functionality for the peripherals attached via the peripheral hardware interface(s) 920. In one embodiment, the peripheral firmware can also be included within or associated with secure boot code 972. The secure boot code 972 can be accompanied by verification code 973 that can be used verify that the boot code 972 has not been modified.

The platform processing system 900 also includes a security processor 960, which is a secure circuit configured to maintain user keys for encrypting and decrypting data keys associated with a user. As used herein, the term "secure circuit" refers to a circuit that protects an isolated, internal resource from being directly accessed by any external circuits. The security processor 960 can be used to secure communication with the peripherals connected via the peripheral hardware interface(s) 920. The security processor 960 can include a cryptographic engine 964 that includes circuitry to perform cryptographic operations for the security processor 960. The cryptographic operations can include the encryption and decryption of data keys that are used to perform storage volume encryption or other data encryption operations within a system.

The platform processing system 900 can also include a storage processor 930 that controls access to data storage within a system, such as, for example, the non-volatile memory 805 of FIG. 8. The storage processor 930 can also include a cryptographic engine 934 to enable compressed data storage within the non-volatile memory. The cryptographic engine 934 can work in concert with the cryptographic engine 964 within the security processor 960 to enable high-speed and secure encryption and decryption of data stored in non-volatile memory. The cryptographic engine 934 in the storage processor 930 and the cryptographic engine 964 in the security processor may each implement any suitable encryption algorithm such as the Data Encryption Standard (DES), Advanced Encryption Standard (AES), Rivest Shamir Adleman (RSA), or Elliptic Curve Cryptography (ECC) based encryption algorithms.

In some embodiments, the hash functions described herein (e.g. SHA256) can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing SHA operations. Accordingly, the system can improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

Accordingly, although such accelerated functions are not necessarily required to implement differential privacy, some embodiments herein, can leverage the prevalence of specialized support for such functions (e.g. cryptographic functions) to potentially improve the overall efficiency of implementations.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment. Accordingly, the true scope of the embodiments will become apparent to the skilled practitioner upon a study of the drawings, specification, and following claims.

What is claimed is:

1. An electronic device comprising:
a first processor to execute a first operating system, the first processor including one or more application processor cores;
a second processor to execute a second operating system, the second processor including one or more processor cores to manage a set of input/output devices within the electronic device; and
an interconnect to enable communication between the first processor and the second processor, wherein the first operating system includes a first communication module, the second operating system includes a second communication module, and the first communication module and the second communication module are to establish a bi-directional network connection over the interconnect and, via the bi-directional network connection, establish a multi-channel inter-process communication link between a first process on the first processor and a second process on the second processor, the multi-channel inter-process communication link including at least a default channel and a reply channel.

2. The electronic device as in claim 1, the first processor to execute a first instruction set architecture and the second processor to execute a second, different instruction set architecture.

3. The electronic device as in claim 2, the interconnect established over a virtual bus connection between the first processor and the second processor.

4. The electronic device as in claim 3, additionally including a hardware copy engine to copy data of the virtual bus connection between the first processor and the second processor.

5. The electronic device as in claim 3, wherein the virtual bus connection is a virtual universal serial bus connection.

6. The electronic device as in claim 1, wherein the first communication module and the second communication module are each a network communication module.

7. The electronic device as in claim 1, the multi-channel inter-process communication link additionally includes a file transfer channel and a byte stream.

8. The electronic device as in claim 7, additionally including a service client to communicate with a service provider over the multi-channel inter-process communication link, the service client to perform a file transfer via the file transfer channel concurrently with transmission of a message over the default channel or the reply channel.

9. The electronic device as in claim 8, the service client additionally to initiate a raw data transfer over the byte stream concurrently with transmission of a message over one the default channel or the reply channel.

10. The electronic device as in claim 9, the service client to communicate with the service provider to enable a device that is physically coupled with the second processor to appear as a device that is physically coupled with the first processor.

11. A non-transitory machine-readable medium storing instruction which, when executed cause one or more processors to perform operations comprising:
receiving an indication of attachment of a device over a virtual bus connection between a platform node and an application node of a computing device;
establishing a device connection over an internal network established between the platform node and the application node;
exchanging a list of one or more services offered on each node for the device;
configuring client capabilities with respect to a service and the device; and
establishing, for the device, a remote communication channel between a client of the service and a provider for the service.

12. The non-transitory machine-readable medium as in claim 11, the operations additionally comprising receiving a request from the client to establish a connection over the internal network between a platform node and an application node.

13. The non-transitory machine-readable medium as in claim 12, the operations additionally including examining, in response to the request from the client, entitlements specified for the client, to determine whether the service allows the client to establish an internal network connection.

14. The non-transitory machine-readable medium as in claim 13, the operations additionally comprising opening an internal network socket to enable communication with a service provider associated with a device in response to determining that the client is allowed to establish the internal network connection.

15. The non-transitory machine-readable medium as in claim 13, the operations additionally comprising denying the request from the client in response to determining that the client is not allowed to establish the internal network connection.

16. A data processing system within an electronic device, the data processing system comprising:
an application node including a first processor configured to execute a first operating system, the application node to enable execution of a user application;
a platform node including a second processor configured to execute a second operating system, the platform node to manage a set of input/output devices within the electronic device; and
an interconnect to enable communication between the application node and the platform node, the interconnect established over a virtual bus connection between a device coupled with the platform node and the user application on the application node, the application node and the platform node to establish a bi-directional network connection over the interconnect, the application node and the platform node to establish a multi-channel inter-process communication link between a first process on the first processor and a second process on the second processor, the multi-channel inter-process communication link including at least a default channel and a reply channel.

17. The data processing system as in claim 16, the multi-channel inter-process communication link additionally including a file transfer channel and a byte stream.

18. The data processing system as in claim 17, the platform node including a service client to communicate with a service provider over the multi-channel inter-process communication link, the service client to perform a file transfer via the file transfer channel concurrently with transmission of a message over the default channel or the reply channel.

19. The data processing system as in claim 18, the service client additionally to initiate a raw data transfer over the byte stream concurrently with transmission of a message over the default channel or the reply channel, wherein the service client is to communicate with the service provider to enable a device that is physically coupled with the second processor to appear as a device that is physically coupled with the first processor.

20. The data processing system as in claim 19, the application node and the platform node to execute instructions to:
receive an indication of attachment of a device to the virtual bus connection;
establish a device connection over the bi-directional network connection;
exchange a list of one or more services offered on each node for the device;
configure client capabilities with respect to a service and the device; and
establish a remote communication channel between a service client and a service provider for the device.

* * * * *

UNITED STATES PATENT AND TRADEMARK OFFICE
CERTIFICATE OF CORRECTION

PATENT NO.       : 10,489,331 B2
APPLICATION NO.  : 16/352502
DATED            : November 26, 2019
INVENTOR(S)      : Anthony J. Chivetta et al.

It is certified that error appears in the above-identified patent and that said Letters Patent is hereby corrected as shown below:

In the Claims

Column 21,
Line 29, Claim 12, delete "a platform node" and insert in place thereof --the platform node--

Column 21,
Lines 29-30, Claim 12, delete "an application node" and insert in place therefor --the application node--

Signed and Sealed this
Twenty-fourth Day of December, 2019

Andrei Iancu
*Director of the United States Patent and Trademark Office*